Patented Mar. 13, 1934

1,950,432

UNITED STATES PATENT OFFICE 1,950,432

POLYMERS OF HALOGENATED HYDROCARBONS AND PROCESS OF PREPARING SAME

Wallace H. Carothers and Arnold M. Collins, Wilmington, Del., assignors to E. I. du Pont de Nemours & Company, Wilmington, Del., a corporation of Delaware No Drawing. Application February 28, 1931, Serial No. 519,243

42 Claims. (Cl. 260—6)

This invention relates to a new class of organic compounds and to the method of their preparation. More particularly it relates to polymers obtained from chloro-2-butadiene-1,3.

Prior art

The compound from which the products of the present invention are derived is fully disclosed in an application of Carothers and Collins, Serial No. 490,538, filed October 22, 1930. It is chloro-2-butadiene-1,3, $CH_2=CCl-CH=CH_2$. This compound can be prepared by the combination of monovinylacetylene with hydrogen chloride. The combination may be effected under a great variety of conditions. A preferred method consists in shaking or stirring monovinylacetylene with a concentrated aqueous solution of hydrogen chloride containing cuprous chloride and ammonium chloride. This method is illustrated by the following example taken from the above identified application.

Example "A"

Fifty grams of cold monovinylacetylene is placed in a pressure bottle containing a thoroughly chilled mixture composed of 175 g. of concentrated hydrochloric acid (sp. gr., 1.19), 25 g. of cuprous chloride, and 10 g. of ammonium chloride. The bottle is closed and shaken until the heat of reaction causes its temperature to rise to about 30° C. This requires about 10 minutes. It is then thoroughly cooled by immersing it in iced water (10-15 minutes). It is then removed from the cooling bath and shaken for three hours. The monovinylacetylene is now almost completely converted into chloro-2-butadiene-1,3 and dichlorobutene. The contents of the bottle are poured into a separatory funnel and the dark aqueous layer is drawn off from the supernatant liquid. The latter is washed with saturated aqueous sodium chloride solution and separated. A small amount of hydroquinone, catechol, or pyrogallol is added to it, and it is dried with anhydrous sodium sulfate or calcium chloride. It is then filtered into a distilling flask containing a small amount of hydroquinone, catechol, or pyrogallol and distilled. A very small amount of distillate boiling at 35-55° C. is frequently obtained. This is a mixture of chloro-2-butadiene-1,3 and monovinylacetylene. It may be separated into its components by redistillation. The main fraction boils at 55 to 75° C. It is substantially pure chloro-2-butadiene-1,3. A higher fraction boiling at 75-135° C. is chiefly dichlorobutene-2. It may be purified further by redistillation. In an actual test 1000 g. of monovinylacetylene (in 20 bottles) gave 1560 g. of reaction product which on distillation gave a few drops of 35-55° C. fraction, 1150 g. of 55-75° C. fraction, 200 g. of 75-135° C. fraction.

The chloro-2-butadiene-1,3 (55-75° C.) fraction may be purified further by redistillation to obtain substantially pure chloro-2-butadiene-1,3 boiling at about 61° C. For this purpose we prefer to use a flask provided with a fractionating column and to carry out the distillation under diminished pressure (100-500 mm.) and in a current of inert gas such as carbon dioxide or nitrogen.

Materials more or less resembling natural rubber have been synthesized in the past but the starting substances have usually been costly or difficult to obtain in large amounts, or the time required to produce a rubber-like material from them has been excessively long, or the rubber-like material produced has been of inferior quality.

Object of invention

An object of the present invention is to effect polymerization of chloro-2-butadiene-1,3. A further object is to prepare new and useful materials of various types and especially to prepare new rubber-like materials from a product readily available in large quantities.

Description of invention

With these objects in view, we have found that it is possible to obtain quickly and easily a synthetic rubber of very good quality by causing chloro-2-butadiene-1,3 to polymerize; and moreover we have found that by suitably regulating the conditions under which the polymerization is effected it is possible to obtain not only rubber-like polymers having various degrees of solubility, plasticity, elasticity, and strength, but also other types of polymers such as readily volatile, odorous liquids, viscous liquids, soft sticky masses, and hard, very tough masses.

The method of effecting the polymerization and the nature of the polymers formed under various conditions are fully illustrated by the following examples which are, of course, furnished merely by way of illustration. It will be observed that the rate of the polymerization is greatly increased by the presence of oxygen (or air), by increased temperature or pressure, and by light.

Example I

A sample of chloro-2-butadiene-1,3 is distilled and sealed off in high vacuum and allowed to stand at the ordinary temperature in the absence of direct light. After 3½ months it has set to a perfectly colorless, transparent, strong elastic jelly. It still contains some unchanged chloro-2-butadiene-1,3. If the chloro-2-butadiene-1,3 is allowed to evaporate the residue resembles cured rubber.

Example II

A sample of chloro-2-butadiene-1,3 is placed in a stoppered bottle containing a small amount of air (about 5% of the volume of the chloro-2-butadiene-1,3) and the bottle is allowed to stand at 25° C. in the absence of direct light. The chloro-2-butadiene-1,3 as already described is a mobile, volatile liquid having a density about 0.952 at 25° C. and a viscosity of about 0.4 centipoise. After one day (24 hours) the viscosity of the sample has increased from 0.4 centipoise to about 6 centipoises. Analysis of the sample at this stage indicates that it contains about 4% of its weight of non-volatile polymer and 96% of unchanged chloro-2-butadiene-1,3. The polymerization of the sample progresses further with time through various stages as indicated below. After two days the viscosity has increased to about 550 centipoises and the density of the sample has become appreciably greater—about 0.98. Analysis at this stage indicates the presence of about 14% of polymer and 88% of unchanged chloro-2-butadiene-1,3. As the polymerization proceeds further the viscosity and the density continue to increase. After 4 days the sample has set to a fairly stiff jelly having a density of about 1.06 and containing about 45% of rubber-like polymer. This jelly gradually shrinks and becomes harder and more tough and dense. During this process of shrinking internal bubbles frequently develop. After 10 days all of the chloro-2-butadiene-1,3 has polymerized.

The product in colorless or pale yellow, transparent, resilient, elastic mass resembling a completely cured soft rubber. It has a density of about 1.23, a tensile strength of about 2000 lbs./in.$^2$ and an elongation of about 800%. When stretched it gives an exceedingly sharp X-ray fiber diffraction pattern. It is not plastic and it does not dissolve but only swells in the usual rubber solvents.

It should be understood that the times indicated in this example are merely illustrative. Due to the fact that the rate of reaction, especially in the earlier stages, is extremely sensitive to very slight influences, the time required for substantially complete polymerization under the conditions of Example II ranges in different experiments from 6-14 days.

Example III

A sample of chloro-2-butadiene-1,3 was allowed to stand under ordinary conditions of temperature and pressure in a closed vessel containing a little air for about 24 hours in the absence of direct light. The product was a somewhat viscous liquid containing unpolymerized chloro-2-butadiene-1,3 in large quantities.

When a film of this liquid was pressed between the surfaces of two pieces of glass and then subjected to conditions adapted to effect polymerization the pieces were found to be firmly cemented.

Example IV

Samples of chloro-2-butadiene-1,3 are placed in glass tubes, one with an equal volume of oxygen, one with an equal volume of air, and one with an equal volume of carbon dioxide. After 2 days at the ordinary temperature the first sample is quite viscous, the second is less viscous, and the third is still less viscous. After 4 days, the first two samples have gelled, while the third is only a viscous liquid.

The effect of temperature on the polymerization is illustrated by the following examples:

Example V

A sample of chloro-2-butadiene-1,3 is stored at −10° C. with an equal volume of air. In 8 days it is polymerized to a viscous liquid.

Example VI

A sample of chloro-2-butadiene-1,3 is stored at 10° C. with an equal volume of air. In 8 days it is polymerized to a stiff jelly.

Example VII

A sample of chloro-2-butadiene-1,3 is stored at 25° with an equal volume of air. In 8 days it is completely polymerized to a tough, rubber-like mass.

Example VIII

A sample of chloro-2-butadiene-1,3 is stored at 80° C. with a small amount of air. After 4 hours it has polymerized to a stiff jelly. After 20 hours practically all the chloro-2-butadiene-1,3 is completely polymerized but the product is much darker in color and softer than that of the preceding example.

Example IX

A sample of chloro-2-butadiene-1,3 is stored at 62° C. in the complete absence of air (high vacuum). After 6 days it is changed to a pale yellow, rubber-like solid similar to the final product of Example II but having a marked terpene-like odor and a lower specific gravity (about 1.18). The odor is due to the presence of volatile polymer. On standing this volatile polymer gradually evaporates.

Example X

A sample of chloro-2-butadiene-1,3 is stored at 100° C. in the complete absence of air. It rapidly thickens and becomes dark in color. After 4 days the polymerization is complete. The product is a black, very viscous liquid. By steam distillation it can be separated to volatile and non-volatile material. The latter is a dark, plastic mass. The volatile material is a liquid having a terpene-like odor. It is a mixture comprising liquids boiling at 92–97° at 27 mm. and 114–118° at 27 mm.

The effect of light on the polymerization is indicated by the following examples:

Example XI

A sample of chloro-2-butadiene-1,3 is placed in a closed Pyrex vessel containing a little air and the vessel is directly illuminated at a distance of about 1 foot by a 100 watt Mazda lamp. The temperature is maintained at about 35° C. After 17 hours the viscosity of the sample has increased to about 14 centipoises and its density to about 0.97. It then contains about 11% of polymer. After 40 hours it has set to a stiff jelly containing about 50% polymer. After 88 hours all the chloro-2-butadiene-1,3 has polymerized and the product is a tough, transparent rubber-like mass resembling the final product of Example II.

Example XII

A sample of chloro-2-butadiene-1,3 is placed in a closed Pyrex glass vessel containing a little air and the vessel is directly illuminated at a distance of about 18 inches by a powerful mercury arc (in quartz). The temperature is maintained at about 40° C. After 16 hours the sample has set to a fairly stiff jelly. After 24 hours all the chloro-2-butadiene-1,3 has polymerized and the product is a colorless, transparent, rubber-like mass resembling the final product of Example II.

Example XIII

This is the same as Example XII except that a transparent quartz vessel was used as a container for the chloro-2-butadiene-1,3 instead of a Pyrex glass vessel. After 16 hours all the chloro-2-butadiene-1,3 had polymerized. The product was a coherent opaque white mass of glistening, hard, tough, elastic, rubber-like granules. These were not only insoluble in the usual rubber solvents, they were not even swelled by such solvents.

The polymerization of chloro-2-butadiene-1,3 is greatly accelerated by elevated pressure. The use of pressure also has some other advantages as illustrated in the following examples:

Example XIV

A sample of chloro-2-butadiene-1,3 which has been exposed to the air for a short time was subjected at the ordinary temperature to a pressure of 4500 atmospheres for 43 hours. It was then completely polymerized. The product was a transparent, very tough, elastic, and rather hard mass resembling a rather strongly vulcanized rubber. In another similar experiment using 6000 atmospheres a similar product was obtained in 16½ hours. Under otherwise similar conditions at ordinary pressure the complete polymerization of chlorobutadiene requires 6 to 14 days and the product is less hard.

Example XV

A sample of chloro-2-butadiene-1,3 which had been distilled in the complete absence of air was without exposing it to the air, subjected to a pressure of 6270 atmospheres for 23 hours at 60° C. The polymerization was practically complete and the product was a soft elastic solid.

Example XVI

In a spherical container provided with a cylindrical neck, a sample of chloro-2-butadiene-1,3 is placed sufficient in volume to more than fill the spherical part of the container. It is then subjected to a pressure of 700 atmospheres for 4 days. The product is a completely cured, soft rubber exactly conforming in shape to the shape of the container.

Example XVII

A sample of chloro-2-butadiene-1,3 completely free of air and containing 1½% of benzoyl peroxide was completely polymerized by heating to 61° for 24 hours. The product was light in color and exceedingly strong and tough. Under otherwise similar conditions, in the absence of benzoyl peroxide, complete polymerization required about 6 days.

Example XVIII

In the complete absence of air one part of benzoyl peroxide was dissolved in 100 parts of chloro-2-butadiene-1,3 and, without exposing it to the air, the mixture was subjected for four hours at 43° C. to a pressure of 5250 atmospheres. The product was a hard, tough, elastic solid. Under otherwise similar conditions, in the absence of benzoyl peroxide, polymerization was still incomplete after 48 hours.

Example XIX

Chloro-2-butadiene-1,3 containing 0.5% of its weight of benzoyl peroxide was heated to 62° C. in the presence of a small amount of air. After 21 hours more than 97% of the chloro-2-butadiene-1,3 had polymerized. Under otherwise similar conditions in the absence of benzoyl peroxide only 56% of the chloro-2-butadiene-1,3 was polymerized in 21 hours.

Example XX

Chloro-2-butadiene-1,3 was mixed with 5% of its weight of turpentine (slightly oxidized by allowing it to stand in contact with air for several months) and allowed to stand in a closed container at the ordinary conditions. After 5 days the polymerization was complete.

Example XXI

Ten g. of chloro-2-butadiene-1,3 was allowed to stand at the ordinary conditions in a vessel containing 0.1 g. of sodium peroxide. After 3 days the polymerization was complete.

(The densities and viscosities mentioned in all these examples are measured at 25° C.)

It is obvious from the above description and examples that the rate of the polymerization may be increased or diminished and the properties of the polymer may be modified by a suitable control of the conditions.

As these examples illustrate (see especially Example II), there is a continuous change in properties during the polymerization of chloro-2-butadiene-1,3 until the reaction is complete and all the chlorobutadiene has disappeared. The special properties of these more or less incompletely polymerized mixtures of chlorobutadiene and its polymers may make it desirable to use them as such. For this purpose as discovered by Carothers, Collins and Kirby and indicated in their copending application Serial No. 519,241, filed February 28, 1931, the polymerization of chloro-2-butadiene-1,3 may be inhibited by the addition of certain anti-catalysts such as catechol, pyrogallol, diphenyl guanidine, m-toluylene diamine, trinitro benzene, etc. By the use of these same materials the polymerization of chloro-2-butadiene-1,3 in admixture with its polymers may be interrupted at any desired stage to obtain a mixture of polymer and unpolymerized chloro-2-butadiene-1,3.

Comparison of Examples I and II indicates the very great effect of oxygen on the rate of polymerization. This is illustrated further in Example IV.

Increasing the ratio of air to chlorobutadiene beyond that indicated in Example II may somewhat further increase the rate, thus with an equal volume of air the reaction may be complete in 5–6 days. In this connection the ratio of surface to volume naturally has considerable effect. If the chlorobutadiene is spread out in a thin layer in the presence of a large volume of air the product is dark in color and much harder than the final product described in Example II. It is also somewhat more dense, e. g., about 1.25.

Examples V and X illustrate the accelerating effect of heat on the rate of polymerization. They also show that the properties of the product are modified by the temperature at which the polymerization occurs. The polymers produced at temperatures above 60° are generally softer and more plastic than those produced at lower temperatures. Moreover, at 60° C. and above, especially in the absence of air, significant amounts of a volatile polymer are formed. This is illustrated especially in Examples IX and X. It is our opinion that the formation of this volatile polymer is a reaction of a different kind than that involved in the formation of the non-volatile polymers described above. The formation of non-volatile polymer is greatly accelerated by oxygen (or air) and less strongly accelerated by heat, while the reverse is true for the volatile polymer. In general, however, the formation of non-volatile polymer is a much faster reaction than the formation of volatile polymer and so the latter is produced in significant amounts only under special conditions and even then it is usually mixed with considerable amounts of the former. The volatile polymer has a marked terpene-like odor so that its presence among the polymeric products is easily recognized.

It will be evident from the above examples that the term "polymer" as applied to the products derived from chloro-2-butadiene-1,3 does not indicate a single chemical individual composed of identically similar molecules but a whole series of materials whose molecules have been formed by the combination of various numbers of chlorobutadiene molecules with each other. Small amounts of other materials, e. g., oxygen from the air, may participate in the formation of these larger molecules and molecules of different sizes may be present in different proportions in different samples. As a result the polymers of chlorobutadiene constitute a continuous series of materials covering a wide range of properties, the successive members of which may be practically indistinguishable. For this reason it is not possible to sharply distinguish all the different types of polymers in terms of their properties. The broad types, volatile and non-volatile polymers, are, however, readily distinguished as already indicated. By the term "volatile" as employed in the present specification we intend to denote a product capable of being distilled as such without decomposition at a temperature below 250° C.

The effect of light on the rate of the polymerization is illustrated by Examples XI-XIII. The most effective wave lengths are the longer ultra-violet and the shorter ones of the visible spectrum. For the most purposes the latter are sufficiently effective and a glass container may be used and sunlight or an ordinary incandescent lamp may be used as the source of the illumination.

Examples IX and XV illustrate the great effect of pressure on the speed of the polymerization. In general, the use of pressure also leads to the formation of tougher, harder and stronger rubber-like products. Example XVI illustrates another advantage of the use of pressure. As illustrated in Example II, at ordinary pressure gelation of the mixture of chlorobutadiene and its polymers occurs long before all the chloro-2-butadiene-1,3 is polymerized, and the contraction which occurs during the subsequent reaction then results in a more or less uneven shrinkage of the finished mass away from the walls of the container and frequently to the formation of internal bubbles. By the use of pressure this may be avoided and its is possible to obtain directly from chlorobutadiene in a single operation a finished and completely cured rubber article exactly conforming in shape to the container used.

The accelerating effects of oxygen, heat, light, and pressure have already been disclosed. For certain purposes it is desirable to augment the speed of polymerization still further or to employ other means of accelerating the polymerization. For this purpose, as disclosed in Examples XVII to XXI, we have found that certain catalysts such as the peroxides may be employed. Among the peroxides which we have found adapted for such use may be mentioned benzoyl peroxide or oxidized turpentine, inorganic peroxides such as sodium peroxide, lead peroxide and hydrogen peroxide. In general, any quantity of the catalyst may be employed and the rate of polymerization will be proportional to the quantity of catalyst present. Inasmuch as each catalyst has a different effect upon the rate of polymerization, the quantity of catalyst necessary to produce a definite rate of polymerization will vary with the particular catalyst employed. A simple experiment, such as illustrated in the examples, will suffice to determine the quantity of catalyst necessary to produce a given rate of polymerization.

The above examples illustrate the formation of volatile polymers of chloro-2-butadiene-1,3 and non-volatile polymers comprising viscous liquids, completely cured plastic masses and more or less plastic and elastic rubber-like products. The usual product of the complete polymerization of chlorobutadiene is a tough, homogeneous material resembling a completely cured soft rubber as indicated in Example II. Under particular conditions, as is evident from the examples, the polymerization may be controlled to form other types of polymers. Thus, under the conditions illustrated in Example XIII, the final product is a material which has the appearance of being crystalline. It is a coherent mass of glistening, hard, rubbery granules or globules. These granules are not only not dissolved by the usual rubber solvents, they are not even swelled. This type of polymer never appears until the polymerization is far advanced toward completion. It is never formed at elevated temperatures and it appears at ordinary temperatures most frequently when metal surfaces are present.

It is to be understood that the appended claims cover not only the polymer products themselves but also cover such products in admixture with chlorobutadiene or other substances.

The partially polymerized chlorobutadiene (i. e., mixtures of chlorobutadiene and its polymers as disclosed in Example III) is adapted for use as an adhesive or as a coating composition. Such materials readily wet cloth or glass, for example, and when spread in a thin film harden to form a tough, elastic, tightly adhering rubber-like coating. When the chlorobutadiene solution of Example III is spread on a smooth surface and allowed to further polymerize the resulting thin film may be stripped from the surface by suitable means to obtain the polymer in the form of a tough elastic sheet.

The usual non-volatile polymer itself is a tough, elastic, extensible, resilient mass resembling rubber. The density of the final rubber-like product varies somewhat according to the conditions under which it is formed but usually lies between 1.16 and 1.25. The tensile strengths range from 500 to 2000 lbs./in.² and the elongations range from 500 up to 1600%. Like natural rubber also, but unlike any synthetic rubber of which any published disclosure has hitherto been made, the rubber from chlorobutadiene on being stretched gives a very sharp X-ray fiber diffraction pattern. Its electrical resistance is very high and its resistance to the action of solvents and chemical agents generally is greater than that of natural rubber. Thus, it is not so strongly swelled by aliphatic hydrocarbon solvents as natural rubber is. It is quite resistant to the action of sunlight. It is, therefore, adapted to any of the uses to which cured natural rubber as such may be put and for many such uses, as would be expected from its properties, is much superior to natural rubber. It is a suitable material for coverings, erasers, tires, pneumatic containers, shock absorbents, elastics, hose, and tubings, sheets and gaskets, stoppers, as an electrical insulator, etc.

As many apparent and widely different embodiments of this invention may be made without departing from the spirit thereof, it is to be understood that we do not limit ourselves to the foregoing examples or descriptions except as indicated in the following claims.

We claim:

1. A polymer of chloro-2-butadiene-1,3.
2. A product varying from a viscous liquid to a hard tough mass and obtained by polymerizing chloro-2-butadiene-1,3.
3. As a new product a volatile liquid polymer of chloro-2-butadiene-1,3 boiling at 92 to 118° C. at 27 mm. pressure.
4. A non-volatile polymer of chloro-2-butadiene-1,3.
5. As a new product a polymerization product of chloro-2-butadiene-1,3 in the form of a viscous liquid.
6. As a new product a polymerization product of chloro-2-butadiene-1,3 in the form of a plastic mass.
7. As a new product a polymerization product of chloro-2-butadiene-1,3 in the form of a tough, elastic mass resembling cured rubber.
8. As a new product a polymerization product of chloro-2-butadiene-1,3 in the form of a granular, elastic material which is not substantially dissolved or swelled by aliphatic hydrocarbon solvents.
9. A product obtainable by allowing chloro-2-butadiene-1,3 to stand until its viscosity has increased to at least 6 centipoises.
10. A product obtainable by allowing chloro-2-butadiene-1,3 to stand exposed to oxygen.
11. A product obtainable by allowing chloro-2-butadiene-1,3 to polymerize in the absence of substantial quantities of oxygen.
12. A rubber-like, elastic mass obtainable by allowing chloro-2-butadiene-1,3 to polymerize at temperatures of approximately 10°–40° C. for from 6–14 days.
13. A rubber-like product obtainable by allowing chloro-2-butadiene-1,3 to polymerize in the presence of air at temperatures of approximately 10°–40° C. for from 6–14 days in the absence of direct light.
14. A rubber-like polymer of chloro-2-butadiene-1,3 having a tensile strength of from 500 to 2000 lbs./in.², an elongation of from 500 to 1600%, showing a sharp X-ray diffraction pattern when stretched and having a density between 1.16 and 1.25.
15. The process of forming a new product which comprises polymerizing chloro-2-butadiene-1,3.
16. The process of forming a new product which comprises allowing chloro-2-butadiene-1,3 to polymerize under oxidizing conditions.
17. The process of forming a new product which comprises allowing chloro-2-butadiene-1,3 to polymerize in the absence of substantial quantities of oxygen.
18. The step of accelerating the polymerization of chloro-2-butadiene-1,3 which comprises heating the same to a temperature of at least 25° C.
19. The step of accelerating the polymerization of chloro-2-butadiene-1,3 which comprises exposing the same to direct light.
20. The step of accelerating the polymerization of chloro-2-butadiene-1,3 which comprises exposing the same to pressure above atmospheric.
21. A process of forming a new product which comprises allowing chloro-2-butadiene-1,3 to polymerize until its viscosity has increased to at least 6 centipoises.
22. The process of forming a new product which comprises allowing chloro-2-butadiene-1,3 to polymerize until its density has increased to at least 1.06.
23. The process of forming a new product which comprises effecting the polymerization of chloro-2-butadiene-1,3 at a temperature between —10 and 100° C.
24. The process of forming a new product which comprises allowing chloro-2-butadiene-1,3 to polymerize for at least two days in the presence of at least 5% of its volume of air.
25. The process of forming a new product which comprises allowing chloro-2-butadiene-1,3 to polymerize under exposure to direct light until its viscosity has increased to at least 14 centipoises.
26. The process of forming a new product which comprises allowing chloro-2-butadiene-1,3 to stand at a temperature of approximately 10°–40° C. and under atmospheric pressure for from 6 to 14 days in the presence of air.
27. The process of claim 26 in which the chloro-2-butadiene-1,3 is also exposed to direct light.
28. The process of forming a new product which comprises heating chloro-2-butadiene-1,3 to a temperature of at least 80° C. until substantially all the chloro-2-butadiene-1,3 has polymerized, and separating from the product by distillation a soft, viscous non-volatile polymer and a liquid volatile polymer.
29. The process of claim 25 in which the heating is carried out in the absence of substantial quantities of air.
30. The process of forming a new product which comprises polymerizing chloro-2-butadiene-1,3 in the presence of a catalyst for the polymerization.
31. A process of forming a new product which comprises polymerizing chloro-2-butadiene-1,3 in the presence of a peroxide.
32. The process of forming a new product which comprises polymerizing chloro-2-butadiene-1,3 in the presence of a peroxide of the class consisting of benzoyl peroxide, oxidized turpentine, sodium peroxide, lead peroxide and hydrogen peroxide until a tough, elastic solid resembling cured rubber is obtained.
33. The process of forming a new product which comprises dissolving one part of benzoyl peroxide in 100 parts of chloro-2-butadiene-1,3 and heating the mixture to effect polymerization.

34. The process of forming a new product which comprises partially polymerizing chloro-2-butadiene-1,3 to obtain a viscous mixture.

35. The process of forming a new product which comprises partially polymerizing chloro-2-butadiene-1,3 to obtain a stiff jelly.

36. The process of forming an article of manufacture which comprises placing chloro-2-butadiene-1,3 in a closed container and subjecting it to pressure to obtain a solid article conforming in shape to the container.

37. A shaped article of manufacture comprising essentially a polymer of chloro-2-butadiene-1,3.

38. As a new product, a polymer of halogen-2-butadiene-1,3.

39. The process of forming a new product which comprises polymerizing halogen-2-butadiene-1,3.

40. The process of forming a tough, elastic polymer of chloro-2-butadiene-1,3 which comprises spreading a liquid comprising chloro-2-butadiene-1,3 in a thin film and exposing the film to air to effect polymerization.

41. The process of claim 40 in which the liquid is a solution containing partially polymerized chloro-2-butadiene-1,3 together with unpolymerized chloro-2-butadiene-1,3.

42. A solid composition of matter identical with that resulting from the polymerization of 2-chloro-butadiene-1,3 which is homogeneous, amorphous and elastic, and having the empirical composition $C_4H_5Cl$.

WALLACE H. CAROTHERS.
ARNOLD M. COLLINS.